United States Patent [19]
Yoshida et al.

[11] Patent Number: 4,957,942
[45] Date of Patent: Sep. 18, 1990

[54] SEMIPERMEABLE MEMBRANE AND PROCESS FOR PREPARING SAME

[75] Inventors: Masashi Yoshida; Katsuhisa Suzuki; Masaaki Yoshikawa, all of Tokyo, Japan

[73] Assignee: Nikkiso Co. Ltd., Tokyo, Japan

[21] Appl. No.: 358,290

[22] Filed: May 26, 1989

[30] Foreign Application Priority Data

May 28, 1988 [JP] Japan ................. 63-131013

[51] Int. Cl.$^5$ ............................................. C08J 9/28
[52] U.S. Cl. ....................................... 521/62; 521/64; 521/138; 210/500.23; 210/500.27; 210/500.41
[58] Field of Search ................ 521/64, 62, 138; 210/500.23, 500.27, 500.41

[56] References Cited

U.S. PATENT DOCUMENTS 4,208,508  6/1980  Hasaino et al. ............. 210/500.81
4,240,914  12/1980 Iwama et al. .............. 210/500.41
4,705,632  11/1987 Yagita et al. ............. 210/500.27
4,746,472  5/1988  Kohn .
4,842,740  6/1989  Chung et al. .............. 210/500.27

FOREIGN PATENT DOCUMENTS 112134    9/1983  European Pat. Off. .
2067200   11/1980 United Kingdom .

Primary Examiner—Morton Foelak
Attorney, Agent, or Firm—Browdy and Neimark

[57] ABSTRACT

The semipermeable membrane contains a polyarylate resin and a polysulfone resin as a major membrane material and has a fibrilliform structure with a high mechanical strength and has a water permeability of 1,500 ml/m$^2$.hr.mmHg or lower as well as an inhibitory rate against bovine serum albumin of 80% or higher and against cytochrome C of 40% or lower. The membrane is prepared by discharging a stock solution containing the polyarylate resin and the polysulfone resin in the total amount of 10% to 25% by weight and a core solution of an organic solvent containing water in the amount of 25% to 80% by volume into a coagulating solution.

6 Claims, 1 Drawing Sheet

SEMIPERMEABLE MEMBRANE AND PROCESS FOR PREPARING SAME

BACKGROUND OF THE INVENTION

1. Field of the Invention

The present invention relates to a semipermeable membrane and a process for preparing the membrane and, more particularly, to a semipermeable membrane capable of being used for blood purification, particularly blood dialysis therapy or blood filtration dialysis therapy for treatment with kidney diseases, drug poisoning and so on.

2. Description of Related Art

Heretofore, semipermeable membranes are used in the industrial field for condensation and purification of beer, juices, milk and so on, desaltination of sea water, and sewage treatment, and in the medical field for artificial dialyzers for use with blood dialysis therapy and blood filtration dialysis therapy.

As materials for semipermeable membranes have been used cellulose, cellulose ester, polyacrylonitrile, polymethyl methacrylate, polyvinyl alcohol, ethylenevinyl alcohol copolymer, polyamide and the like. Recently polysulfone resins, polyether sulfone resins, polyarylate resins and so on which have been developed as engineering plastics are utilized as a material for a semipermeable membrane in the medical field due to their favorable mechanical strength, thermal resistance and chemical resistance as well as excellent biocompatibility.

Generally, when a semipermeable membrane with an excellent permeability of waste products, water and so on is formed using the polyarylate resin or polysulfone resin only, it is required that a structure of the membrane be formed so as to allow its cross section to provide a high permeability while a high degree of denseness on membrane surfaces are prevented. It is thus desired that its cross section in the thickness direction is of a network structure, namely, of a fibrilliform structure, in which continuous micropores penetrate through the membrane in the direction of thickness thereof. In other words, a void structure or a so-called sponge-like structure having a less quantity of penetrating micropores is not preferred.

It is to be noted, however, that a semipermeable membrane formed using such a polyarylate resin or polysulfone resin as a sole ingredient may provide a membrane surface with a remarkably dense structure on account of a strength for its intermolecular aggregation and has the likelihood to provide a void structure, or a sponge-like structure, in which a polymer structure lacks in a cross-sectional direction of the membrane. Such membranes suffer from the disadvantages that a permeability of waste products in the blood, water and the like is low, their voids penetrate through their cross section up to the surface thereof, and a mechanical strength is impaired as well.

Inorder to solve these disadvantages and drawbacks, various attempts have been made so far. For example, Japanese Patent Kokai Nos. 293,502/1986, 20,085/1986, and 47,367/1987 disclose methods in which there is used as a stcok solution for forming membranes a mixture of a polysulfone resin as a semipermeable-membrane material and a solvent with an additive such as a metal salt, e.g., lithium chloride, calcium chloride or the like, or a water-soluble polymer, e.g., polyvinyl pyrrolidone, polyvinyl acetate, polyethylene glycol or the like, or a non-solvent or a swelling agent such as water, methanol, ethanol, isopropanol, ethylene glycol or the like. An addition of the additive, non-solvent, swelling agent or the like is to control a surfacial or cross-sectional structure of the membrane. The semipermeable membranes as disclosed in the above patent applications are relatively small in a water-permeable amount and excellent in albumin fractionation, however, the additive, non-solvent or swelling agent should be thoroughly removed after a formation of the semipermeable membranes. If such a substance would be remained unremoved from the membrane, it may be eluated into the blood from the membrane during blood dialysis. This affects patients seriously.

Japanese Patent Kokai Nos. 245,805/1986, 197,006/1986 and 238,834/1986 disclose other semipermeable membranes formed using a polysulfone resin. Although they are superior in mechanical properties, they are large in a water-permeable amount and in pore size so that they present problems that even useful materials in the blood are filtered off when they are used for the blood dialysis therapy.

Examples of semipermeable membranes formed from a polyarylate resin are disclosed in Japanese Patent Publication Nos. 27,964/1983 and 34,166/1983. The semipermeable membranes may be used for fractionating a substance having a small molecular weight, for example, polyethylene glycol having molecular weights ranging from approximately 6,000 to 20,000. If these membranes would be used for the blood dialysis therapy, they may remove a substance having a relatively low molecular weight, such as urea, creatinine or uric acid. However, it would be difficult to remove $\beta_2$-microglobulin (molecular weight: 11,800) with a high removal percentage, which is considered to be a casual substance of amyloidosis that is caused to develop at a high rate on patients who are subjected to dialysis for many years.

On the other hand, a selectively gas-permeable membrane is disclosed in Japanese Patent Kokai No. 127,602/1984, which is used in the technical field completely different from the field in which a liquid such as the blood is filtered. The membrane may be formed using an aromatic polyester having a recurring unit as represented by following formula:

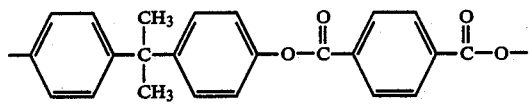

and a polymer having a recurring unit as represented by following formula:

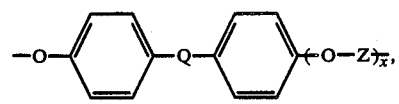

(where Q may be $-SO_2-$, and Z may be

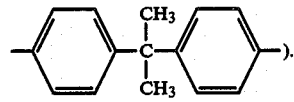

).

The above patent publications state that the selectively gas-permeable membrane is of a structure containing a dense layer with unsymmetrical pore sizes having an average pore size ranging from 0.001 to 0.01 μm. More specifically, the membrane is of a void structure in which inner pores extend to the bottom surface in a vertical direction with respect to the membrane surface and arranged in a regular orientation. Furthermore, a sponge-like structure of wall portions partitioning the inner pores from each other is extremely dense. In other words, the selectively gas-permeable membrane is of no uniformly fibrilliform structure because the structure has unsymmetrical pore sizes and is of the void structure in which the inner pores develop in a slender shape.

It is presumed that this structure is created by steps of coagulating a stock solution which involve immersing it in a non-solvent or water or which involve partially evaporating a solution by heating after the stock solution has been casted.

The above patent publications further state that an average pore size increases as a ratio of the aromatic polyester to a polymer admixed therewith approaches 1 to 1, thus disorganizing a dense layer on the surfacial side of the membrane and enlarging a gas permeability yet reducing a selective gas permeability. It is expressly stated that this is based on the fact that a reduction in miscibility with heterogeneous polymers becomes to the maximum level so that the admixture ratio around 1 to 1 is not preferred.

SUMMARY OF THE INVENTION

The present invention has the first object to provide a semipermeable membrane which has a network structure with continuous micropores penetrated therethrough, i.e., a fibrilliform structure, and dialyze hazardous substances such as $\beta_2$-microglobulin effectively yet blocking filtration of useful substances such as albumin with a high efficiency.

The present invention has the second object to provide a process for the production of the semipermeable membrane having the structure and properties as have been described hereinabove.

In order to achieve the above first object, the present invention consists of a semipermeable membrane comprising a polyarylate resin and a polysulfone resin as major membrane materials and having a water permeability of 1,500 ml/m$^2$.hr.mmHg or lower as well as an inhibitory rate of bovine serum albumin of 80% or higher and an inhibitory rate of cytochrome C of 40% or lower.

In order to achieve the above second object, the present invention consists of a process for the production of the semipermeable membrane in which a stock solution containing a total amount of a polyarylate resin and a polysulfone resin ranging from 10% to 25% by weight and an organic solvent solution containing water at a rate ranging from 25% to 80% by volume are discharged from a double pipe spinneret into a coagulating solution, producing a hollow semipermeable membrane.

BRIEF DESCRIPTION OF THE DRAWINGS

Other objects, features and advantages will become apparent in the course of the description of the preferred embodiments which follows in conjunction with the accompanying drawings, in which.

DETAILED DESCRIPTION OF THE PREFERRED EMBODIMENTS

Figure 1:
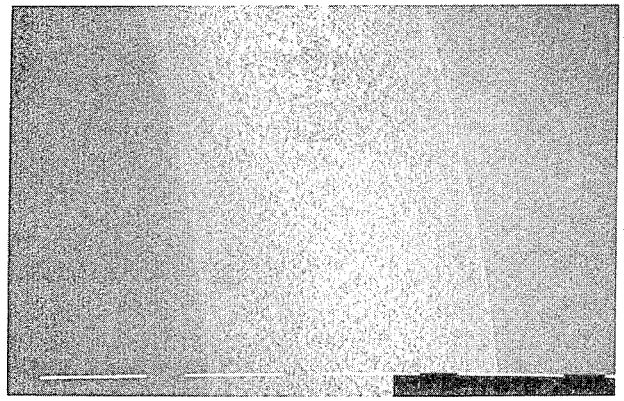
FIG. 1 is a photograph showing a cross section of the membrane obtained in Example 1.

The semipermeable membrane according to the present invention comprises a polyarylate resin (A) and a polysulfone resin (B).

Preferred examples of the polyarylate resin (A) have a recurring unit as represented by following formula (1):

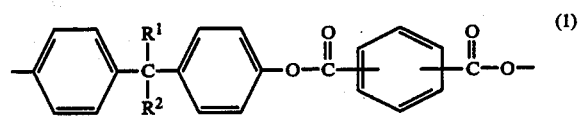

(where R$^1$ and R$^2$ are identical to or different from each other and each stands for a lower alkyl group having from 1 to 5 carbon atoms).

The term "lower alkyl group" referred to as R$^1$ and R$^2$ is intended to mean a monovalent, straight-chain or branched-chain, saturated aliphatic hydrocarbon residue including, for example, methyl, ethyl, propyl, butyl or pentyl. Most preferred is methyl.

The polyarylate resin (A) is not restricted to a particular one as long as it has the recurring unit as represented by the formula (1) above as a major recurring unit. Preferred resin (A) may have a molecular weight ranging from approximately 20,000 to approximately 50,000.

Preferred examples of the polysulfone resin (B) have at least one of the following recurring units (2) and (3) below:

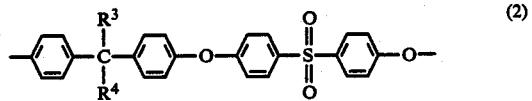

(where R$^3$ and R$^4$ are identical to or different from each other and each stands for a lower alkyl group) and

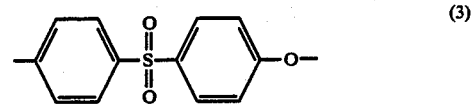

The term "lower alkyl group" referred to as R$^3$ and R$^4$ is the same as R$^1$ and R$^2$.

The polysulfone resin (B) is not restricted to a particular one as long as it has the recurring units (2) and/or (3), and has a molecular weight ranging preferably from approximately 20,000 to approximately 40,000.

The semipermeable membrane according to the present invention comprises the polyarylate resin (A) and the polysulfone resin (B) in a ratio by weight of the resin (A) to the resin (B) ranging usually from 0.1:1 to 10:1, preferably from 0.3:1 to 4:1. The membrane containing them outside the above ratio is likely to be lesser in fibrilliform structure.

The semipermeable membrane according to the present invention has a water permeability of approximately 1,500 ml/m$^2$.hr.mmHg or lower. If the water permeability comes outside this range, the inhibitory rate of albumin is reduced, thus losing a large number of alubumin.

The water permeability referred to in this specification is determined as a value computed by the following formula:

$$L_p = \frac{K}{a \cdot h \cdot p}$$

(where
$L_p$ is a water permeability (ml/m$^2$.hr.mmHg);
K is a water-permeable amount (ml);
a is an effective membrane area (m$^2$);
h is a time required for water penetration (hr); and
p is a pressure for filtration (mmHg).
In the above formula, the water-permeable amount defined by K is measured by feeding distilled water under nitrogen pressure to a module formed from the membrane.

The semipermeable membrane according to the present invention has an inhibitory rate of bovine serum albumin of 80% or higher, preferably 90% or higher.

The semipermeable membrane according to the present invention further has an inhibitory rate of cytochrome C of 40% or lower. If the inhibitory rate of cytochrome C exceeds 40%, a removal of $\beta_2$-microglobulin in the dialysis therapy becomes difficult.

The inhibitory rates of albumin and cytochrome C are computed by the following formula:

$$R = \left(1 - \frac{2 C_1}{C_2 + C_3}\right) \times 100$$

where
R is an inhibitory rate (%);
$C_1$ is a concentration of a filtrate;
$C_2$ is a concentration of a module inlet; and
$C_3$ is a concentration of a module outlet.

The semipermeable membrane according to the present invention may be in a form of film, tube or hollow filament. The membrane in the hollow filament form is preferred from the viewpoint of the shape of a module to be prepared, readiness of producing membranes, and an advantage for spinning.

As have been described hereinabove, the semipermeable membrane according to the present invention has a fibrilliform structure and excellent characteristics of effectively inhibiting a filtration of useful substance in the blood such as albumin and the like yet filtering such hazardous substances having molecular weights as $\beta_2$-microglobulin. It is thus preferred that the semipermeable membrane according to the present invention is used in the form of a hollow filament for the blood therapy.

The semipermeable membrane in the hollow filament form may be prepared by the process according to the present invention.

The semipermeable membrane according to the present invention may be preferably prepared from a stock solution obtainable by dissolving the polyarylate resin (A) and the polysulfone resin (B) in a total amount ranging from 10% to 25% by weight, preferably from 12% to 20% by weight in an organic solvent. If the total amount is below the lower limit, a strength of the resulting membrane is impaired. If the total amount exceeds the upper limit, a porosity of the resulting membrane is reduced leading to a reduction in membrane performance and to the likelihood to get gelled.

For the stock solution, a ratio by weight of the polyarylate resin (A) to the polysulfone resin (B) may be preferably adjusted to correspond to the weight ratio of the polyarylate resin (A) to the polysulfone resin (B) in the resulting membrane, i.e., from 0.1:1 to 10:1, preferably from 0.3:1 to 4:1.

In the preparation of the stock solution, a resin compatible with the polyarylate resin (A), such as a polyester resin or a polyamide resin, may be added to the stock solution in an amount which does not impair the objects of the present invention in order to adjust a viscosity of the stock solution and improve a strength of the resulting membrane.

As the organic solvent may be used any organic solvent which is inert and is not reactive with the polyarylate resin (A) and the polysulfone resin (B) and which may include, for example, tetrahydrofuran, dioxane, dimethylformamide, dimethylacetamide or N-methyl-2-pyrrolidone. Most preferred is N-methyl-2-pyrrolidone.

The stock solution may be prepared by dissolving the polyarylate resin (A) and the polysulfone resin (B) in the organic solvent one by one or by dissolving a mixture of the resins (A) and (B) therein. Temperatures at which the resins (A) and (B) are dissolved in the organic solvent may range generally from 30° C. to 100° C., preferably from 50° C. to 80° C.

Although an addition of the additive such as the non-solvent, swelling agent and the water-soluble polymer to the stock solution enables a formation of the fibrilliform structure in the resulting membrane, it is not required to be added to the stock solution.

The stock solution is then formed into the semipermeable membrane in a given shape.

The semipermeable membrane may be prepared by coagulating the stock solution using a coagulating solution.

In order to provide the membrane with the uniform fibrilliform structure, it is preferred to use a mixture of water with the organic solvent used for dissolving the resins rather than water only, as the coagulating solution. For the coagulating solution, a concentration of water in the organic solvent may be in the range usually from 25% to 80% by volume, preferably from 30% to 70% by volume. If the amount of water is too much, a void structure is likely to develop in a direction of cross section of the resulting membrane. On the contrary, if the amount of water is too small, the fibrilliform structure becomes too large in size and coarse and it may take a longer time to coagulate the stock solution, thus presenting the difficulty of forming it into a semipermeable membrane.

The organic solvent to be used for coagulating the stock solution may include, for example, tetrayhydrofuran, dioxane, dimethyformamide, dimethylacetamide and N-methyl-2-pyrrolidone. Preferred is N-methyl-2-pyrrolidone.

In order to adjust a coagulating velocity, there may be added an alcohol such as methanol, ethanol, isopropanol or glycerine, a glycol such as ethylene glycol or propylene glycol, or the like.

The semipermeable membrane in the form of a hollow filament may be prepared by discharging the coagulating solution together with a core solution from a double pipe spinneret and coagulating them in the hollow filament form.

As the double pipe spinneret may be used any one that may provide a semipermeable membrane with given inner and outer diameters suitable for designing blood dialyzers.

A temperature of the double pipe spinneret at which the stock solution is discharged may range from 0° C. to 80° C., preferably from 0° C. In the range of the temperatures, a stability and a viscosity of the stock solution can be maintained to an appropriate level.

The core solution may preferably comprise substantially the same composition in substantially the same concentration as the coagulating solution.

Although the double pipe spinneret may be designed so as to come into contact wtih the coagulating solution during a discharge of the stock solution into the coagulating solution, a space in a predetermined distance may be provided from the spinneret to a surface of the coagulating solution, and the distance may range from approximately 5 mm to 100 mm.

The semipermeable membrane spun is then washed with water in order to wash out the organic solvent and thereafter dried.

The dried semipermeable membrane is formed into a module which is then activated with an organic solvent such as methanol, ethanol or the like. An activator is used after a substitution of water therefor. It is to be noted, however, that such an activation is not required if a water-soluble substance such as glycerine is added to the semipermeable membrane prior to the drying and dried.

As have been described hereinabove, the semipermeable membrane according to the present invention comprising the polyarylate resin (A) and the polysulfone resin (B) has microspores with an average spore size of 0.05 $\mu$m or larger on its surface and a uniform fibrilliform structure in a cross-sectional direction of the membrane, thus providing a favorable water permeability as well as excellent characteristics including a high inhibitory rates against substance such albumin and a high filterability of such hazardous substances having molecular weights as $\beta_2$-microglobulin.

The present invention will be described more in detail by way of examples.

EXAMPLE 1

As the polyarylate resin was used a polyarylate resin having a recurring unit in which $R^1$ is methyl and $R^2$ is methyl in the above formula (1) (hereinafter referred to as "PA"; Trademark: "U-2030"; K. K. Unitika). As the polysulfone resin was used a polysulfone resin having the some recurring unit as represented by the formula (3). (hereinafter referred to as "PES"; Trademark: "Victrex ® 4800P"; Imperial Chemical Industries, Inc.). A stock solution was prepared by dissolving equivalent amounts of PA and PES in the total amount of 17% by weight in N-methyl-2-pyrrolidone (hereinafter referred to as NMP) at 60° C.

The semipermeable membrane was prepared by discharging a core solution (50% by volume of NMP and 50% by volume of water) from an inner side of the double pipe spinneret while discharging the stock solution from the outer side thereof into a coagulating solution consisting of 60% by volume of NMP and 40% by volume of water after having passed through an air passageway in a length of 20 mm to 50 mm, thus coagulating the stock solution to form a hollow filament membrane. The temperature of the spinneret was 7°-8° C.

The hollow filament membrane was washed with water and dried to form a module having an effective membrane area of 0.15 m².

The resulting membrane was observed for its surfacial and cross-sectional (in a direction of thickness) structures by means of scanning electron microscope (SEM). Furthermore, the module was tested for its permeability of distilled water and inhibitory rates aginst each of the ingredients of filtrates prepared from bovine albumin (molecular weight: 66,000) and equine cytochrome C (molecular weight: 12,300). The water permeability and the inhibitory rates were determined by the formulas as have been expressed hereinabove.

The SEM observation revealed from the photograph as shown in FIG. 1 that the membrane has a network structure, i.e., a fibrilliform structure, having continuous through-holes in a cross section thereof. Test results are shown in Table below.

EXAMPLE 2

The procedures of Example 1 were followed with the exception that a core solution consisting of 55% by volume of NMP and 45% by volume of water was used, thus producing a hollow filament membrane and then formed into a module which, in turn, was likewise tested for its permeability of distilled water and inhibitory rates against the filtrate ingredients. The membrane was also observed for its membrane structure with SEM. The test results are shown in Table below.

EXAMPLE 3

The procedures of Example 1 were followed with the exception that a stock solution was prepared containing the total quantity of 16% by weight of equal amounts of PA and PES and 84% by weight of NMP, and a coagulating solution consisting of 60% by volume of NMP and 40% by volume of water was used, thus producing a hollow filament membrane and then formed into a module which, in turn, was likewise tested for its permeability of distilled water and inhibitory rates against the filtrate ingredients. The membrane was also observed for its membrane structure with SEM. The test results are shown in Table below.

COMPARATIVE EXAMPLE 1

Figure 2:
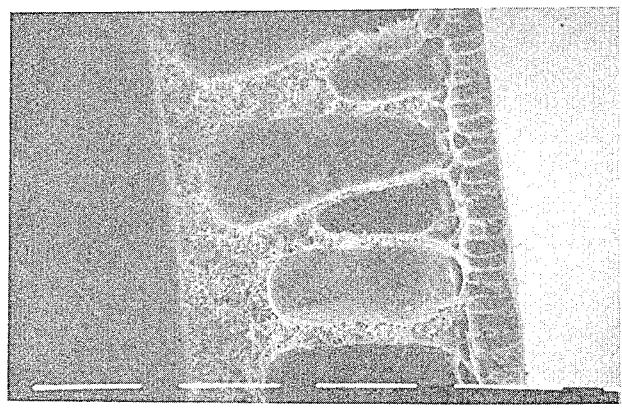
FIG. 2 is a photograph showing a cross section of the membrane obtained in Comparative Example 1.

The procedures of Example 1 were followed with the exception that a stock solution was prepared by dissolving PES in NMP to amount to 20% by weight. The resulting hollow filament was observed for its membrane structure with SEM. As shown in FIG. 2, it was found that the membrane comprises a sponge-like structure with a number of voids present in its cross section.

The hollow filament membrane was then formed into a module which, in turn, was likewise tested for its permeability of distilled water and inhibitory rates against bovine albumin and equine cytochrome C. The test results are shown in Table below.

COMPARATIVE EXAMPLE 2

A hollow filament was prepared in substantially the same manner as in Example 1 with the exception that a 75% by volume aqueous NMP solution was used as a core solution. The hollow filament was formed into a module which, in turn, was measured for its water permeability and inhibitory rates against bovine albumin and equine cytochrome C. Test results are shown in Table below.

COMPARATIVE EXAMPLE 3

A hollow filament was prepared in substantially the same manner as in Example 1 with the exception that only water was used as a core solution. The hollow filament was formed into a module which, in turn, was measured for its water permeability and inhibitory rates against bovine albumin and equine cytochrome C. Test results are shown in Table below.

TABLE

|  | Water Permeability (ml/m² · hr. mmHg) | Inhibitory Rates (%) | |
| --- | --- | --- | --- |
|  |  | Albumin | Cytochrome C |
| Example 1 | 635 | 100 | 18 |
| Example 2 | 800 | 95 | 2 |
| Example 3 | 730 | 97 | 2 |
| Comparative Ex. 1 | 85 | 100 | 95 |
| Comparative Ex. 2 | 1,700 | 57 | 1 |
| Comparative Ex. 3 | 200 | 98 | 80 |

As have been described hereinabove, the semipermeable membrane according to the present invention comprises the polyarylate resin and the polysulfone resin, thus providing a fibrilliform structure which is high in mechanical strength as well as excellent in a water permeability. It is further provided with excellent membrane characteristics with respect to an inhibitory rate against useful substances in the blood such as albumin and a filtration ability of hazardous substances such as $\beta_2$-microglobulin and the like.

The process for the production of the semipermeable membrane according to the present invention is noted because it can produce the semipermeable membrane having the excellent characteristics as have been described hereinabove in an extremely simplified manner and even without use of any additive, non-solvent, swelling agent and the like.

As is apparent from the results as shown in Table above, the semipermeable membrane according to the present invention has a high filterability of equine cytochrome C (molecular weight: 12,300) so that it can filter substances having molecular weights lower than cytochrome C. Thus it is useful for removing $\beta_2$-microglobulin (molecular weight: 11,800) that is a casual substance of amyloidosis likely to develop at a high rate among patients who are subjected to dialysis therapy for a long period of time.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes and modifications which come within the meaning and range of equivalency of the claims are therefor intended to be encompassed within the spirit and scope of the invention.

What is claimed is:

1. A process for preparing a semipermeable membrane comprising the step of discharging a stock solution comprising a polyarylate resin and a polysulfone resin in a total amount ranging from 10% to 25% by weight and a core solution comprising water in an amount ranging from 25% to 80% by volume and an organic solvent into a coagulating solution.

2. A process as claimed in claim 1, wherein said polyarylate resin has a recurring unit as represented by

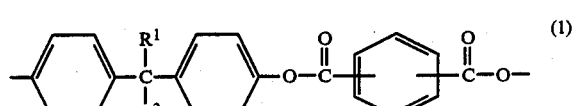

(where
R¹ and R² is identical to or different from each other stands for a lower alkyl group having from 1 to 5 carbon atoms); and
said polysulfone resin has a recurring unit as represented by following formula:

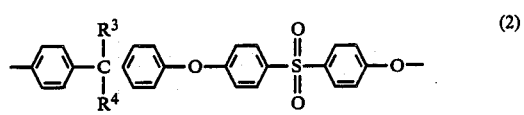

(where (
R³ and R⁴ are identical to or different from each other and stand for a lower alkyl group) and/or a recurring unit as represented by following formula:

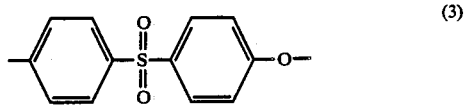

3. A process as claimed in claim 1, wherein said total amount ranges from 12% to 20% by weight.

4. A process as claimed in claim 1, wherein said stock solution comprises said polyarylate resin and said polysulfone resin in a ratio by weight of said polyarylate resin to said polysulfone resin ranging from 0.1:1 to 10:1.

5. A process as claimed in claim 4, wherein said ratio ranges from 0.3:1 to 4:1.

6. A process as claimed in claim 1, wherein said stock solution is discharged into said coagulating solution from a double pipe spinneret.

* * * * *